Patented May 25, 1943

2,319,933

UNITED STATES PATENT OFFICE

2,319,933

PROCESS OF MAKING ADHESIVE TAPES

Earl G. Kerr, Leonia, N. J., assignor, by mesne assignments, to Allied Chemical & Dye Corporation, a corporation of New York No Drawing. Application May 25, 1940,
Serial No. 337,200

2 Claims. (Cl. 117—122)

This invention relates to adhesive tapes and more particularly to adhesive tapes, the adhesive of which is of the pressure-sensitive type.

There are employed for numerous purposes, for example in painting and finishing automotive vehicle bodies, adhesive tapes constituted of a cellulose or fabric backing and a layer of pressure-sensitive adhesive involving rubber containing a volatile solvent. The use of transparent regenerated cellulose (known in the trade as "Cellophane") tapes has in recent years found wide application. One difficulty accompanying the use of such adhesive tape has been the tendency of the adhesive eventually to dry out and lose its tacky characteristics owing to evaporation of the solvent. Furthermore, in the case of transparent regenerated cellulose, it has been found that some of the adhesives heretofore proposed present the added difficulty of not bonding satisfactorily with the cellulose base.

It is an object of the invention to provide a pressure-sensitive adhesive tape constituted of a backing and an improved pressure-sensitive adhesive.

It is a further object of this invention to provide an improved pressure-sensitive adhesive substantially free from volatile solvents and which is not subject to loss of its tacky pressure-sensitive characteristics owing to evaporation of solvent. Other objects and advantages will appear hereinafter.

I have found that by blending paracoumarone resin of a softening point of 50° C. or lower with chlorinated rubber a substantially permanently tacky pressure-sensitive adhesive mass is obtained which may be employed for coating cellulose, fabric or other flexible backing to produce pressure-sensitive adhesive tape. The adhesive is substantially free from volatile solvent and hence is not subject to loss of tackiness by solvent evaporation. As the chlorinated rubber constituent of the adhesive, the chlorinated rubber containing from 65 to 70 per cent of chlorine now obtainable under the name "Tornesit" may be employed.

The ratio of paracoumarone resin to chlorinated rubber in the adhesive may be varied from about 1 to about 20, preferably from 5 to 10 parts by weight of the resin to 1 part of the chlorinated rubber, depending on the tackiness which it is desired to impart to the adhesive and the properties such as the softening point of the resin and the rubber. The degree of tackiness of the adhesive may be varied by varying the softening point of the resin employed or varying the proportions of the resin and chlorinated rubber utilized. In carrying the invention into effect, the paracoumarone resin may be melted until it is fluid and then stirred with the chlorinated rubber until the resin and rubber are intimately blended and produce a homogeneous mixture.

Paracoumarone resin, as is well known, is made by polymerizing constituents such as coumarone and indene present in coal tar naphtha. Resins made by the polymerization of distillates obtained from petroleum and natural gas including cracked distillates have properties similar to the properties of paracoumarone resin and may be employed in lieu of paracoumarone resin in practicing the invention.

As illustrative of the invention, the following examples are given:

Example I

A blend of paracoumarone resin, constituted of 47 parts by weight of resin having a softening point (ring and ball) of about 25° C. and 40 parts by weight of paracoumarone resin having a softening point (ring and ball) of about 10° C., which blend had a softening point (ring and ball) of about 19° C., was heated until the resin blend was a mobile liquid. Thirteen parts by weight of chlorinated rubber having a chlorine content of 65 to 68 per cent were added to the liquid resin and the mixture was agitated until a homogeneous product was obtained. The paracoumarone resin was blended with the chlorinated rubber at a temperature below about 150° C., preferably within the range of from 40° to 100° C. to avoid decomposition of the chlorinated rubber. This blend was applied in heated condition to a face of a "Cellophane" strip to produce adhesive tape. The adhesive coating of this tape possessed pressure-sensitive adhesive characteristics and did not lose its tackiness upon prolonged exposure to air. The tape may be wound in rolls with the adhesive coating on the inner face of each convolution, in a manner well known in the adhesive tape art.

Other examples of pressure-sensitive adhesives in accordance with the invention are as follows, parts being by weight:

|  | Examples | | | |
|---|---|---|---|---|
|  | II | III | IV | V |
| Chlorinated rubber | 10 | 10 | 10 | 16 |
| Paracoumarone resin— Softening point— | | | | |
| 49° C. (ring and ball) | 90 | | | |
| 7° C. (ring and ball) | | 90 | | |
| 37° C. (ring and ball) | | | 90 | |
| 39° C. (ring and ball) | | | | 84 |
| Total | 100 | 100 | 100 | 100 |

The 37° C. softening point resin of Example IV was made by blending 70 parts of 7° C. softening point paracoumarone resin with 20 parts by weight of 111° C. softening point resin. The 39° C. softening point resin of Example V was made by blending 66 parts of 7° C. softening point resin with 18 parts of 111° C. softening point resin. The above adhesive compositions were applied as adhesive to flexible backing strips to produce adhesive tapes.

If desired plasticizers such as dibutyl phthalate, tricresyl phosphate, amyl stearate, ethyl abietate, and methyl cyclohexanol adipate may be employed, preferably in small amounts, in the composition.

From the above description of the invention, it will be seen that I have provided novel pressure-sensitive adhesive tapes constituted of a flexible base, preferably a transparent regenerated cellulose base, and an adhesive consisting of paracoumarone resin of a softening point of 50° C. or lower and chlorinated rubber, which adhesive is substantially permanently tacky and is not subject to hardening and loss of tackiness by evaporation of volatile solvent upon exposure to the air and may be of sufficiently light color for use on light colored tapes. It is to be understood that the reference herein to paracoumarone resin of a softening point of not over 50° C. is intended to include blends of resins or of resins and plasticizers which blends have a softening point not over about 50° C. although individual constituents of the blends, as in Examples IV and V have softening points above 50° C. The adhesive has characteristics which make it especially suited for uses in which a pressure-sensitive, substantially permanently tacky adhesive is desired.

The softening points given herein were determined in accordance with the standard ring and ball method for determining softening points of bituminous materials prescribed by the American Society for Testing Materials.

What is claimed is:

1. A process of making substantially permanently tacky, pressure-sensitive tape which comprises heating together from 1 to 20 parts by weight of paracoumarone resin of a softening point not substantially above 50° C. (ring and ball) and 1 part by weight of chlorinated rubber having a chlorine content of from about 65 to 70 per cent, and applying this blend consisting substantially entirely of paracoumarone resin and chlorinated rubber in heat-liquefied condition substantially free from volatile solvent to a flexible backing.

2. A process of making substantially permanently tacky, pressure-sensitive adhesive tape which comprises heating together from 5 to 10 parts by weight of paracoumarone resin of a softening point (ring and ball) not substantially above 50° C. with 1 part by weight of chlorinated rubber having a chlorine content of from about 65 to 70 per cent to form a homogeneous blend of the resin and chlorinated rubber, and applying this blend consisting substantially entirely of said paracoumarone resin and chlorinated rubber and substantially free from volatile solvent in heat-liquefied condition to a flexible backing.

EARL G. KERR.